(12) United States Patent
Sun et al.

(10) Patent No.: US 9,574,940 B2
(45) Date of Patent: Feb. 21, 2017

(54) DETECTING SYSTEM

(71) Applicant: NATIONAL CENTRAL UNIVERSITY, Jhongli, Taoyuan County (TW)

(72) Inventors: Ching-Cherng Sun, Yangmei (TW); Yeh-Wei Yu, Pingzhen (TW); Ting-Wei Lin, New Taipei (TW); Che-Chu Lin, Pingzhen (TW)

(73) Assignee: NATIONAL CENTRAL UNIVERSITY, Jhongli, Taoyuan County (TW)

(*) Notice: Subject to any disclaimer, the term of this patent is extended or adjusted under 35 U.S.C. 154(b) by 297 days.

(21) Appl. No.: 14/518,537

(22) Filed: Oct. 20, 2014

(65) Prior Publication Data

US 2015/0369695 A1    Dec. 24, 2015

(30) Foreign Application Priority Data

Jun. 20, 2014    (TW) .............................. 103121465 A

(51) Int. Cl.
*G01J 3/28*         (2006.01)
*G01M 11/00*    (2006.01)
(Continued)

(52) U.S. Cl.
CPC ................ *G01J 3/28* (2013.01); *G01J 1/0403* (2013.01); *G01J 1/0437* (2013.01); *G01J 1/0477* (2013.01);
(Continued)

(58) Field of Classification Search
CPC ...... G01J 1/0403; G01J 1/0437; G01J 1/0477; G01J 1/4257; G01J 2001/4252; G01J 2001/448; G01J 2001/4247; G01J 3/0229; G01J 3/28; G01M 11/00; G01M 11/005; G01M 11/02; G01M 11/0207; G01M 11/0214; G01M 11/0221; G01M 11/0228; G01M 11/0235; G01M 11/0242; G01M 11/025; G01M 11/0257; G01M 11/0264; G01M 11/0271; G01M 11/0278; G01M 11/0285; G01M 11/0292; G01M 11/04
See application file for complete search history.

(56) References Cited

U.S. PATENT DOCUMENTS 9,091,614 B2 * 7/2015 Ohkubo ............. G01M 11/0257
2005/0219522 A1 * 10/2005 Jones ..................... G01M 11/00
356/239.1
(Continued)

FOREIGN PATENT DOCUMENTS

EP         2562526        2/2013
TW       201317549      5/2013

*Primary Examiner* — Gordon J Stock, Jr.
(74) *Attorney, Agent, or Firm* — Muncy, Geissler, Olds & Lowe, P.C.

(57) ABSTRACT

A detecting system for detecting an under-test light of an under-test object includes a light spatial distribution unit, a chromatic-dispersion light-splitting unit and a detecting unit. The light spatial distribution unit is disposed on a side of the under-test object to receive the under-test light and form a plurality of point light sources. The chromatic-dispersion light-splitting unit is disposed on a side of the light spatial distribution unit to receive the point light sources and produce a light-splitting signal. The detecting unit is disposed on a side of the chromatic-dispersion light-splitting unit to receive the light-splitting signal and produce an optical field distribution of the under-test light.

22 Claims, 12 Drawing Sheets

(51) Int. Cl.
    *G01J 1/42*     (2006.01)
    *G01J 3/02*     (2006.01)
    *G01J 1/04*     (2006.01)
    *G01J 1/44*     (2006.01)

(52) U.S. Cl.
    CPC ............ *G01J 1/4257* (2013.01); *G01J 3/0229* (2013.01); *G01M 11/00* (2013.01); *G01J 2001/4247* (2013.01); *G01J 2001/4252* (2013.01); *G01J 2001/448* (2013.01)

(56) References Cited

U.S. PATENT DOCUMENTS

| | | | | |
|---|---|---|---|---|
| 2007/0188741 | A1* | 8/2007 | Fleischmann | G01M 11/0242 356/124 |
| 2009/0109401 | A1* | 4/2009 | Van Heugten | A61B 3/1015 351/221 |
| 2013/0100280 | A1* | 4/2013 | Sun | G01J 1/0403 348/135 |
| 2013/0262006 | A1* | 10/2013 | Chang | G01J 3/505 702/81 |

* cited by examiner

DETECTING SYSTEM

CROSS REFERENCE TO RELATED APPLICATIONS

This Non-provisional application claims priority under 35 U.S.C. §119(a) on Patent Application No(s). 103121465 filed in Taiwan, Republic of China on Jun. 20, 2014, the entire contents of which are hereby incorporated by reference.

BACKGROUND OF THE INVENTION

Field of Invention

The invention relates to a detecting system and, in particular, to a detecting system of an optical field distribution.

Related Art

For the past few years, with the unceasing improvement in the process and material, many kinds of light sources, such as LED, are continuously developed. Due to the process factor, every light source or optical element has its peculiar optical field distribution. Besides, LED often has a problem of uneven spatial color distribution, so the optics designer needs to find out its optical field distribution and spatial color distribution and then can execute a precise design and optical simulation to fit the standard of the optical product. Therefore, every light source or optical element needs to undergo the test of spectrum and optical field distribution.

In the conventional art, a light distribution curve instrument is used to detect the spectrum and optical field distribution. However, the light distribution curve instrument is mostly a goniophotometer, which requires several executions of single-point scanning, so the detection takes a long time.

Therefore, it is an important subject to provide a detecting system which can replace the conventional goniophotometer and rapidly detect the spatial spectrum and optical field distribution of the light source or optical element.

SUMMARY OF THE INVENTION

In view of the foregoing subject, an objective of the invention is to provide a detecting system which can replace the conventional goniophotometer and rapidly detect the spatial spectrum and optical field distribution of the light source or optical element To achieve the above objective, a detecting system of the invention for detecting an under-test light of an under-test object includes a light spatial distribution unit, a chromatic-dispersion light-splitting unit and a detecting unit. The light spatial distribution unit is disposed on a side of the under-test object to receive the under-test light and form a plurality of point light sources. The chromatic-dispersion light-splitting unit is disposed on a side of the light spatial distribution unit to receive the point light sources and produce a light-splitting signal. The detecting unit is disposed on a side of the chromatic-dispersion light-splitting unit to receive the light-splitting signal and produce an optical field distribution of the under-test light.

In one embodiment, the light spatial distribution unit is a screen which has a plurality of holes.

In one embodiment, the screen is flat structure or a curved structure.

In one embodiment, the screen includes a screen body and a carbon powder layer or a print layer, and the carbon powder layer or the print layer is disposed on the surface of the screen body adjacent to the under-test object.

In one embodiment, the material of the light spatial distribution unit is cloth, black flannelette, paper, black flannelette paper, glass, fiber or plastic.

In one embodiment, the light spatial distribution unit is a lens array, mirror array or their combination.

In one embodiment, the lens array is a convex lens array, concave lens array, Fresnel lens array or grin lens array.

In one embodiment, the mirror array is a concave mirror array, a convex mirror array or a plane mirror array.

In one embodiment, the under-test object is a light emitting element or an optical element.

In one embodiment, the chromatic-dispersion light-splitting unit is a triangular prism, an optical grating, a holographic optical element, a Blazed grating or a light splitter composed of a plurality optical elements.

In one embodiment, the detecting unit is a brightness photometer, illuminometer, power meter, camera or spectrometer.

In one embodiment, the optical field distribution is a light intensity distribution or light spectrum distribution in space.

In one embodiment, the detecting unit and the under-test object are disposed on the same side of the light spatial distribution unit.

In one embodiment, the detecting unit and the under-test object are disposed on different sides of the light spatial distribution unit.

In one embodiment, the detecting system further comprises a holding unit, which keeps the relative distances between the under-test object, the light spatial distribution unit, the chromatic-dispersion light-splitting unit and the detecting unit.

In one embodiment, the detecting system further comprises a cover, which has an accommodating space for accommodating the under-test object, the light spatial distribution unit, the chromatic-dispersion light-splitting unit and the detecting unit.

In one embodiment, the detecting system further comprise a light receiving unit, which is disposed between the light spatial distribution unit and the chromatic-dispersion light-splitting unit, so that the point light sources form an optical field pattern on the light receiving unit.

In one embodiment, the light spatial distribution unit and the chromatic-dispersion light-splitting unit are integrated into a single piece.

To achieve the above objective, a detecting system of the invention for detecting an under-test light of an under-test object comprises a chromatic-dispersion light-splitting unit, a light spatial distribution unit and a detecting unit. The chromatic-dispersion light-splitting unit is disposed on a side of the under-test object to receive the under-test light and form a light-splitting signal. The light spatial distribution unit is disposed on a side of the chromatic-dispersion light-splitting unit to receive the light-splitting signal and generate a plurality of point light sources. The detecting unit is disposed on a side of the light spatial distribution unit to receive the point light sources and generate an optical field distribution of the under-test light.

In one embodiment, the light spatial distribution unit is a lens array.

In one embodiment, the detecting system further comprises a light receiving unit, which is disposed between the light spatial distribution unit and the detecting unit and receives the point light sources and generates a plurality of light-receiving signals. The detecting unit receives the light-receiving signals and generate the optical field distribution of the under-test light.

In one embodiment, the light spatial distribution unit and the chromatic-dispersion light-splitting unit are integrated into a single piece.

As mentioned above, the detecting system of the invention can detect the under-test light of an under-test object. The light spatial distribution unit receives the under-test light and forms a plurality of point light sources of different positions, the chromatic-dispersion light-splitting unit receives the point light sources and generates a light-splitting signal, and the detecting unit receives the light-splitting signal to generate the spectrum and optical field distribution of the under-test light. By the detecting system of the invention, the spectrum and optical field distribution of the under-test object can be detected just by one-time detection step, unlike the multi-time single-point detection executed by the conventional goniophotometer. Therefore, the detecting system of the invention has advantages such as low cost and rapid detection and can detect the spatial spectrum distribution.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
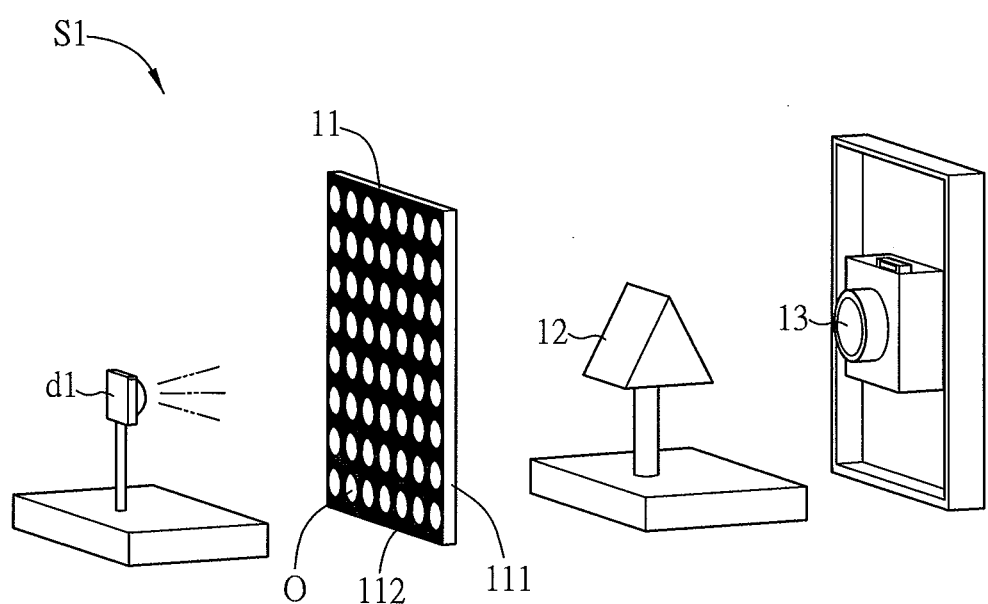
FIG. 1 is a schematic diagram of a detecting system of the first embodiment of the invention.

FIG. 1 is a schematic diagram of a detecting system of an embodiment of the invention. As shown in FIG. 1, the detecting system S1 is used to detect an under-test light of an under-test object and includes a light spatial distribution unit 11, a chromatic-dispersion light-splitting unit 12 and a detecting unit 13. To be noted, the under-test object is a light source or an optical element for example. The light source is an LED (light emitting diode), OLED (organic light emitting diode), CCFL (cold cathode fluorescent lamp), HCFL (hot cathode fluorescent lamp) or other light sources for example. The optical element is a diffusion sheet, brightness enhancement film (BEF), prism sheet or other optical elements for example. In this embodiment, the under-test object is an LED d1 for example. The LED d1 can be supported and fixed by a carrier, and a driving circuit is disposed inside the LED d1 to drive the LED to emit light, and the light emitted by the LED d1 is just the under-test light.

In this embodiment, the light spatial distribution unit 11 is a screen, which is a flat structure and disposed on a side of the LED d1. The material of the light spatial distribution unit 11 can be cloth, black flannelette, paper, black flannelette paper, glass, fiber or plastic for example. In this embodiment, the screen is paper that is accessible and costs less. The screen has a screen body 111, and the surface of the screen body 111 adjacent to the LED d1 is coated with a carbon powder layer or a print layer and herein a carbon powder layer 112 is illustrated as an example. The carbon powder layer 112 can be disposed on the screen body 111 by spraying or printing. The carbon powder layer 112 can be black or grey black so as to avoid the noise from being generated that is caused by the light reflection. In addition to the screen, the light spatial distribution unit 11 also can be, in other embodiments, a lens array, mirror array or their combination.

In this embodiment, the screen can further have a plurality of holes O, which can be formed on the screen by punching. When the light emitted by the LED d1 illuminates the screen, since the light reaching the carbon powder layer 112 can't pass through the screen, and only the light reaching the holes O can pass through the screen, a plurality of point light sources corresponding to the holes O can be formed.

In this embodiment, the chromatic-dispersion light-splitting unit 12 is a triangular prism, but this invention is not limited thereto. The chromatic-dispersion light-splitting unit 12 also can be an optical grating, holographic optical element, Blazed grating or light splitter composed of a plurality optical elements. The chromatic-dispersion light-splitting unit 12 is disposed on a side of the light spatial distribution unit 11. In this embodiment, the chromatic-dispersion light-splitting unit 12 and the LED d1 are disposed on different sides of the light spatial distribution unit 11. As shown in FIG. 1, when the point light sources formed by the holes O illuminate the chromatic-dispersion light-splitting unit 12, the chromatic-dispersion light-splitting unit 12 will split the light of the all point light sources to produce a light-splitting signal. Because the triangular prism (the chromatic-dispersion light-splitting unit 12) has different refractive indexes for the light with different wavelengths, the light can be split into the light beams with different wavelengths.

In this embodiment, the detecting unit 13 is a camera, but this invention is not limited thereto. The detecting unit 13 also can be a brightness photometer, illuminometer, power meter or spectrometer. The detecting unit 13 is disposed on a side of the chromatic-dispersion light-splitting unit 12. In this embodiment, the detecting unit 13 and the LED d1 are disposed on the different sides of the light spatial distribution unit 11. The light-splitting signal obtained by the split of the chromatic-dispersion light-splitting unit 12 can be received by the detecting unit 13 and therefore the optical field distribution of the LED d1 can be generated.

In this embodiment, the optical field distribution of the LED d1 indicates the intensity distribution or spectrum distribution of the light of the LED d1. Since the light beams of the light of the LED d1 at different positions can be extracted by the holes O on the light spatial distribution unit 11 and the chromatic-dispersion light-splitting unit 12 can give wavelength split to the light beams of different positions, the detecting unit 13 of this embodiment can detect both of the light intensity distribution of different positions and the spectrum distribution of different positions. By the detecting system S1 of this embodiment, the optical field distribution of the under-test object can be detected just by one-time detection step, unlike the multi-time single-point detection executed by the conventional goniophotometer. Therefore, the detecting system S1 of this embodiment has advantages such as low cost and fast detection.

Figure 2A:
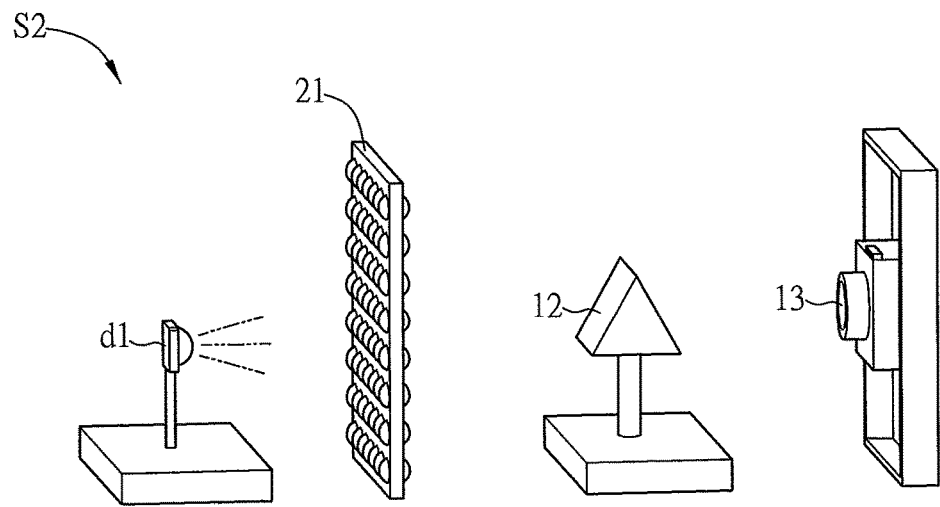
FIG. 2A is a schematic diagram of a detecting system of the second embodiment of the invention.
Figure 2B:
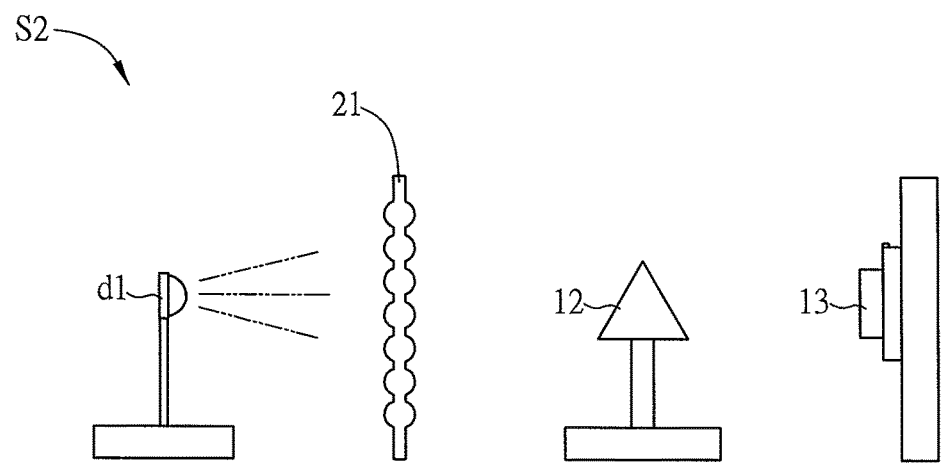
FIG. 2B is a schematic side view of the detecting system in FIG. 2A.

FIG. 2A is a schematic diagram of a detecting system of the second embodiment of the invention, and FIG. 2B is a schematic side view of the detecting system in FIG. 2A. As shown in FIGS. 2A and 2B, the main difference from the previous embodiment is that the light spatial distribution unit 21 of the detecting system S2 of this embodiment is a convex lens array including a plurality of convex lenses arranged in an array. Since the convex lens array is penetrable for the light and capable of focusing light, when the light of the LED d1 illuminates the light spatial distribution unit 21, a plurality of point light sources corresponding to the convex lenses will be generated on the other side of the light spatial distribution unit 21. Then, the chromatic-dispersion light-splitting unit 12 can receive the point light sources and do the light split to them so as to generate the light-splitting signal. The detecting unit 13 receives the light-splitting signal to generate the optical field distribution of the LED d1. In addition to the convex lens array, the light spatial distribution unit 21 also can be a concave lens array, Fresnel lens array or grin lens array in other embodiments.

In this embodiment, since the light spatial distribution unit 21 can focus the light beams of the light of the LED d1 at different positions to generate the plural point light sources and the triangular prism can give wavelength split to the light beams of different positions, the detecting unit 13 of this embodiment can detect both of the light intensity distribution of different positions and the spectrum distribution of different positions.

Figure 3A:
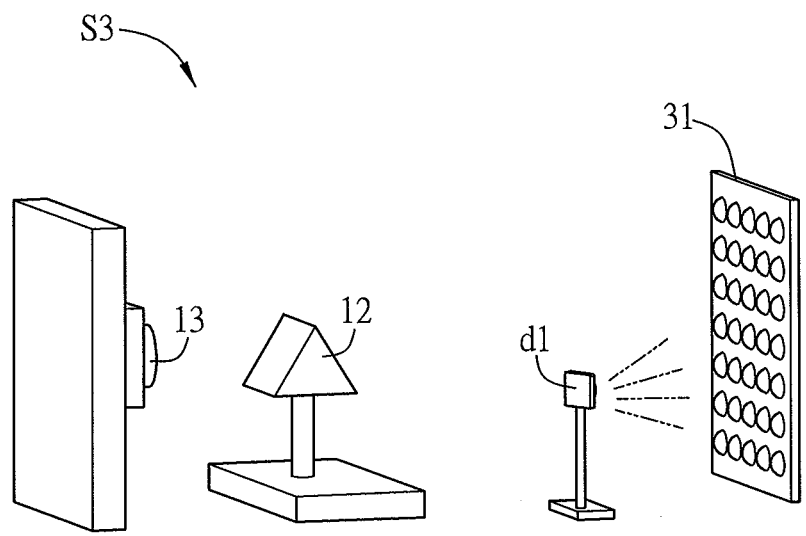
FIG. 3A is a schematic diagram of a detecting system of the third embodiment of the invention.
Figure 3B:
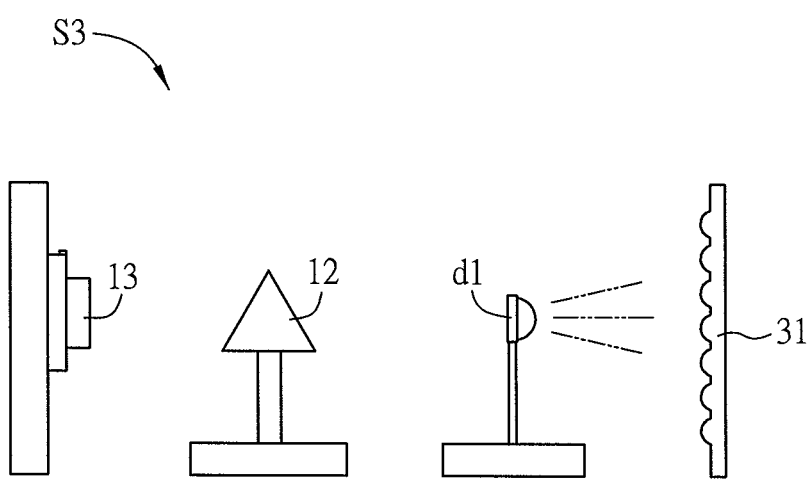
FIG. 3B is a schematic side view of the detecting system in FIG. 3A.

FIG. 3A is a schematic diagram of a detecting system of the third embodiment of the invention, and FIG. 3B is a schematic side view of the detecting system in FIG. 3A. As shown in FIGS. 3A and 3B, the main difference from the previous embodiment is that the light spatial distribution unit 31 of the detecting system S3 of this embodiment is a convex lens array including a plurality of convex lenses arranged in an array and the detecting unit 13 and the LED d1 are disposed on the same side of the light spatial distribution unit 31. Accordingly, the light emitted by the LED d1 will be reflected and focused by the convex lenses disposed at different positions and then becomes a plurality of point light sources. When receiving the point light sources, the chromatic-dispersion light-splitting unit 12 will generate the light-splitting signal. Then, the detecting unit 13 can generate the optical field distribution of the LED d1 after receiving the light-splitting signal.

Figure 4A:
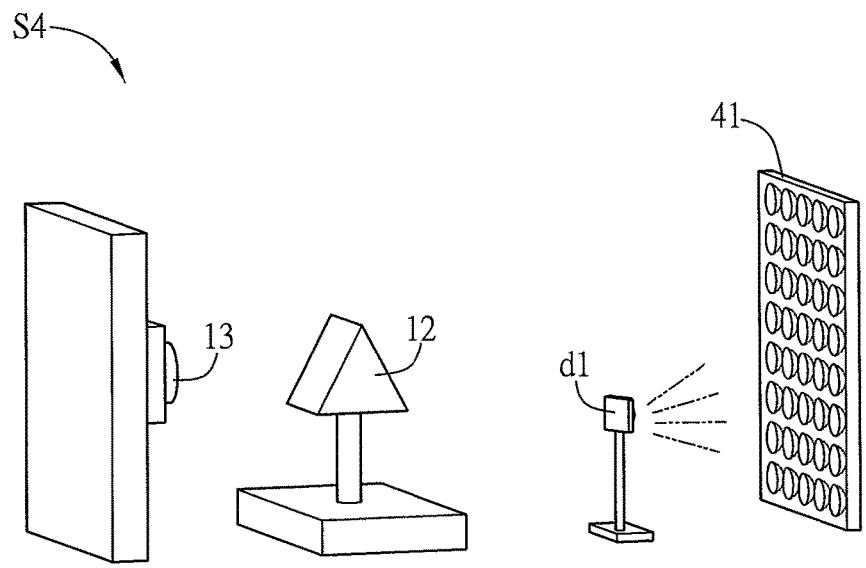
FIG. 4A is a schematic diagram of a detecting system of the fourth embodiment of the invention.
Figure 4B:
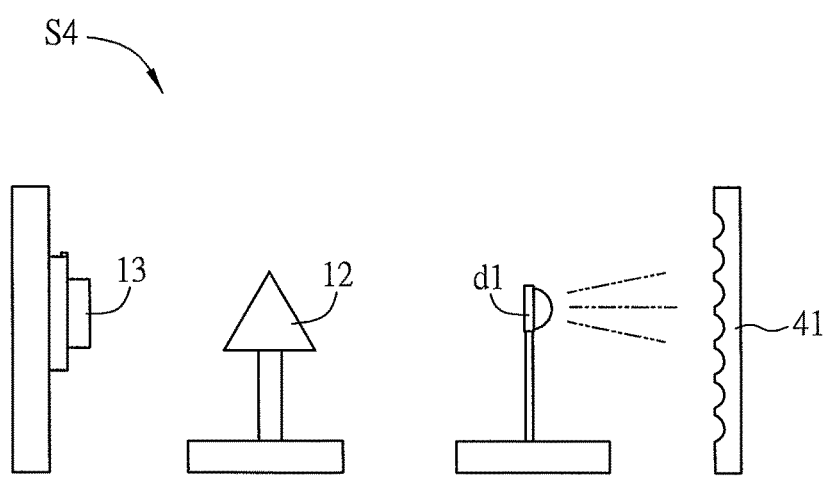
FIG. 4B is a schematic side view of the detecting system in FIG. 4A.

FIG. 4A is a schematic diagram of a detecting system of the fourth embodiment of the invention, and FIG. 4B is a schematic side view of the detecting system in FIG. 4A. As shown in FIGS. 4A and 4B, the main difference from the previous embodiment is that the light spatial distribution unit 41 of the detecting system S4 of this embodiment is a concave lens array. The rest illustration can be comprehended by referring to the previous embodiment. Actually, the light spatial distribution unit also can be a plane mirror array in addition to the convex or concave mirror array.

Figure 5:
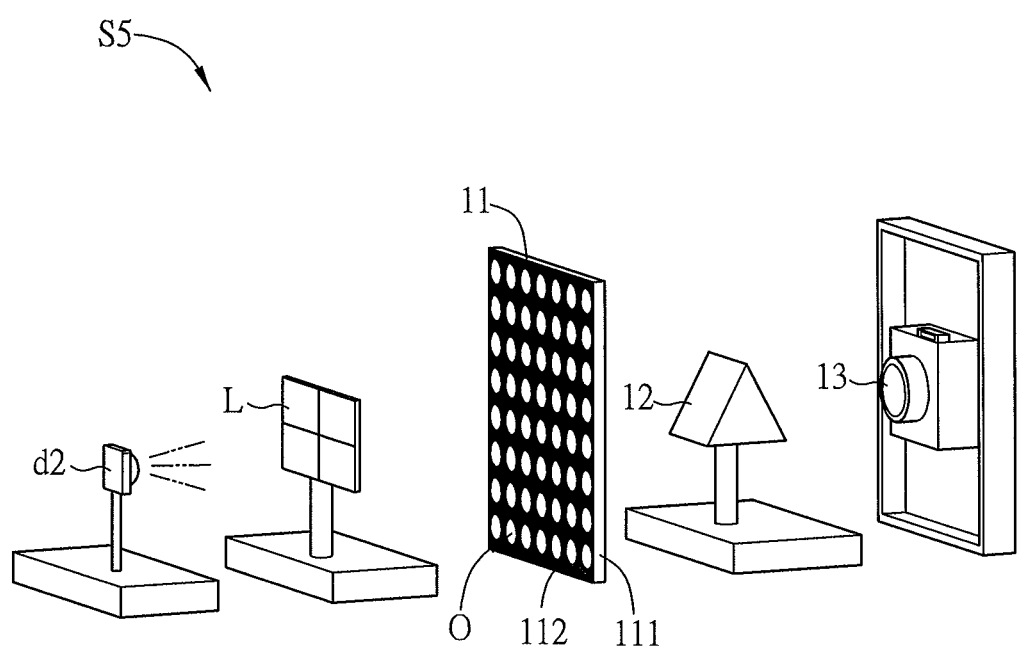
FIG. 5 is a schematic diagram of a detecting system of the fifth embodiment of the invention.

FIG. 5 is a schematic diagram of a detecting system of the fifth embodiment of the invention. As shown in FIG. 5, the main difference from the first embodiment (detecting system S1 in FIG. 1) is that the under-test object of the detecting system S5 of this embodiment is an optical element L, which is a diffusion sheet for example. The under-test light means the light emitted from the optical element L when another light source (e.g. LED d2) emits light to the optical element L. The light passing through the optical element L will enter the light spatial distribution unit 11. Since only the light illuminating the holes O will pass through the light spatial distribution unit 11, the under-test light can form a plurality of point light sources corresponding to the holes O disposed at different positions by the holes O on the light spatial distribution unit 11. Then, the chromatic-dispersion light-splitting unit 12 can do the light split so as to generate the light-splitting signal that corresponds to the characteristic of the optical element L. Therefore, the detecting unit 13 can generate the optical field distribution that corresponds to the characteristic of the optical element L after receiving the light-splitting signal.

Figure 6:
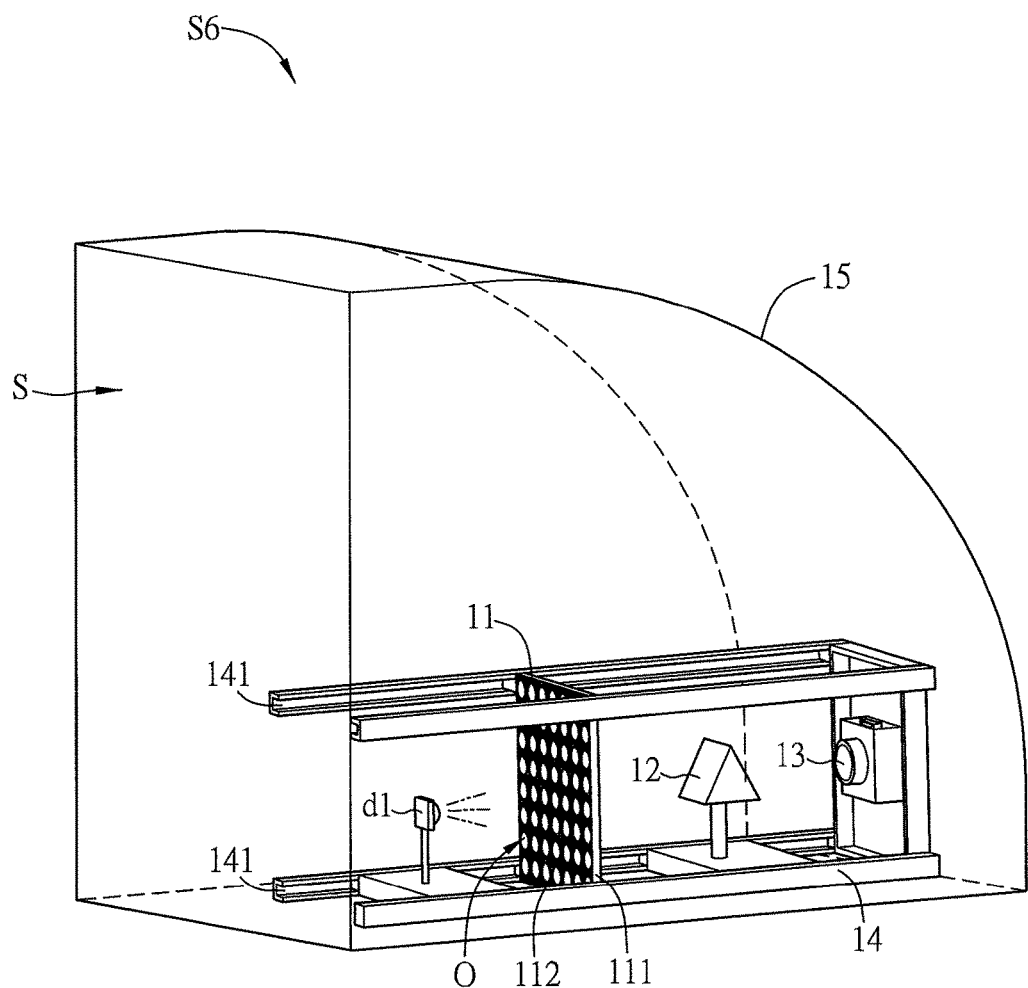
FIG. 6 is a schematic diagram of a detecting system of the sixth embodiment of the invention.

FIG. 6 is a schematic diagram of a detecting system of the sixth embodiment of the invention. As shown in FIG. 6, the main difference from the first embodiment (detecting system S1 in FIG. 1) is that the detecting system S6 of this embodiment can further include a holding unit 14, which can keep the relative distances between the LED d1, the light spatial distribution unit 11, the chromatic-dispersion light-splitting unit 12 and the detecting unit 13. To be noted, the structure of the holding unit 14 in FIG. 6 is just for the illustrative purpose, and the holding unit 14 can have other structures as long as it can keep the relative distances between them.

The holding unit 14 of this embodiment can further include a track groove 141, and the LED d1, the light spatial distribution unit 11 and the chromatic-dispersion light-splitting unit 12 can have a sliding mechanism corresponding to the track groove 141. Thereby, the above elements can be adjusted in their relative positions according to the requirements. Moreover, the detecting system S6 of this embodiment further include a cover 15, and the inside of the cover 15 has an accommodating space S for accommodating the LED d1, the light spatial distribution unit 11, the chromatic-dispersion light-splitting unit 12 and the detecting unit 13. Herein, the inside of the cover 15 is favorably a totally dark environment to prevent the environmental light from affecting the detection result.

Figure 7A:
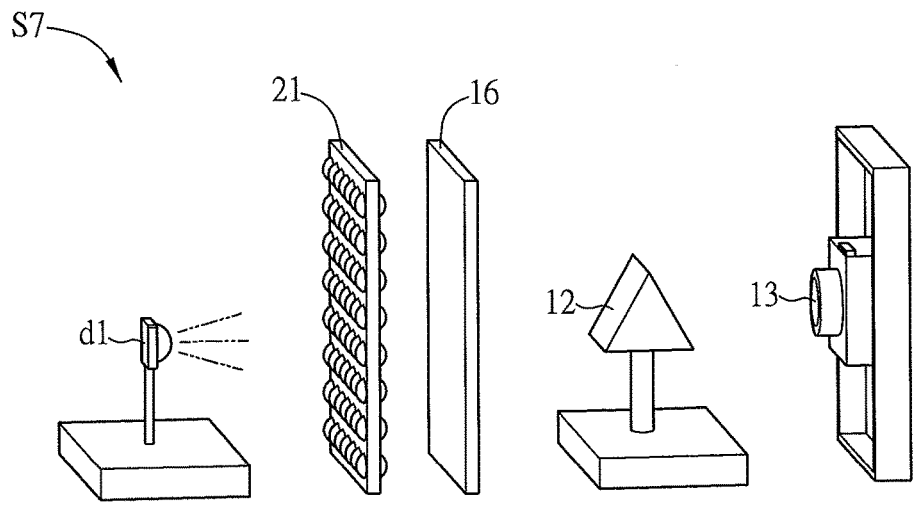
FIG. 7A is a schematic diagram of a detecting system of the seventh embodiment of the invention.
Figure 7B:
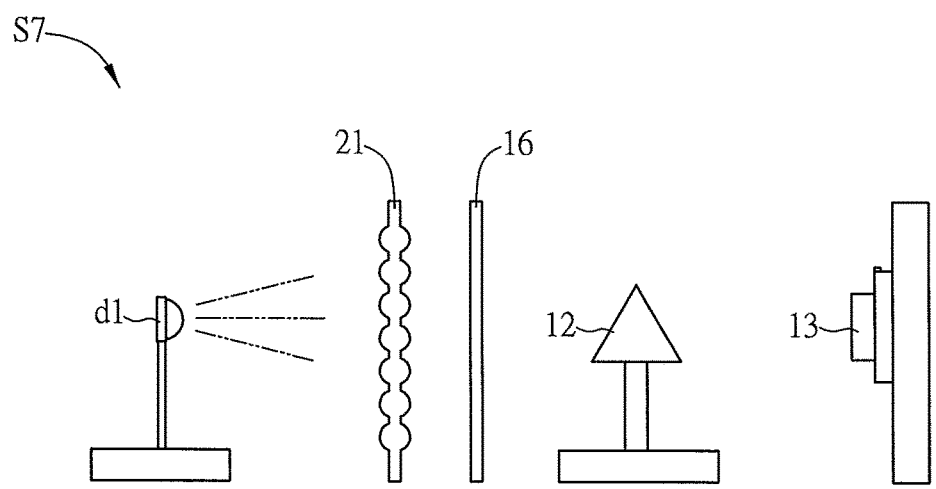
FIG. 7B is a schematic side view of the detecting system in FIG. 7A.

FIG. 7A is a schematic diagram of a detecting system of the seventh embodiment of the invention, and FIG. 7B is a schematic side view of the detecting system in FIG. 7A. As shown in FIGS. 7A and 7B, the main difference from the foregoing embodiment (detecting system S2 in FIG. 2A) is that the detecting system 57 of this embodiment further includes a light receiving unit 16, which is disposed between the light spatial distribution unit 21 and the chromatic-dispersion light-splitting unit 12. The light receiving unit 16 can be a white screen for example, so that the plural point light sources emitted from the light spatial distribution unit 21 will form an optical field pattern on the light receiving unit 16. Then, the optical field pattern will be converted into the light splitting signal by the chromatic-dispersion light-splitting unit 12. The rest illustration is about the same as the foregoing embodiment (detecting system S2 in FIG. 2A) and therefore is omitted here for conciseness.

Figure 8A:
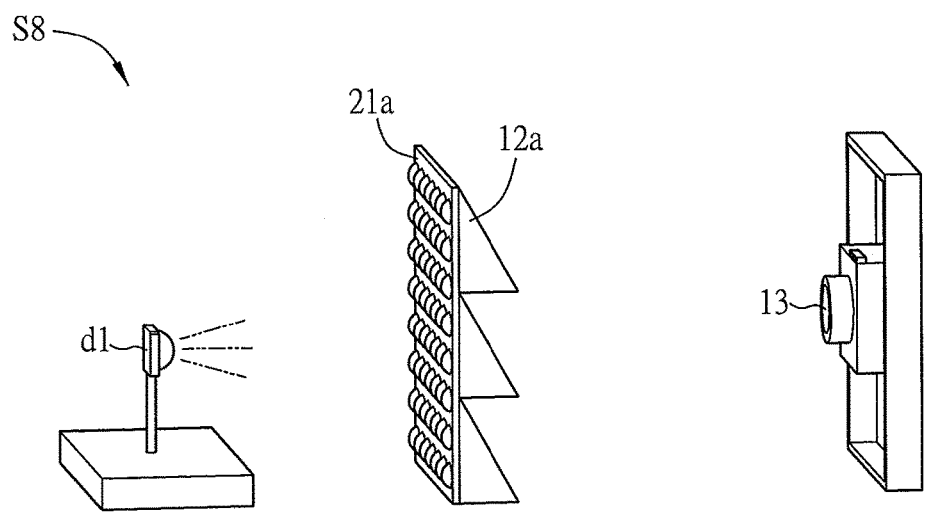
FIG. 8A is a schematic diagram of a detecting system of the eighth embodiment of the invention.
Figure 8B:
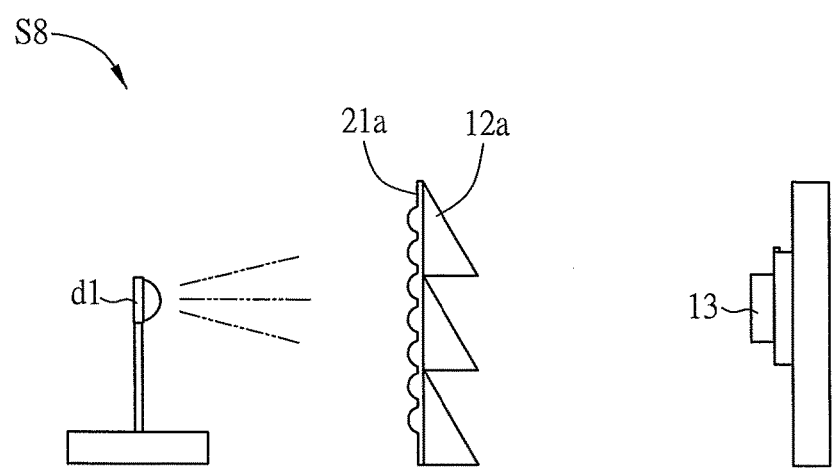
FIG. 8B is a schematic side view of the detecting system in FIG. 8A.

FIG. 8A is a schematic diagram of a detecting system of the eighth embodiment of the invention, and FIG. 8B is a schematic side view of the detecting system in FIG. 8A. As shown in FIGS. 8A and 8B, the main difference from the foregoing embodiment (detecting system S2 in FIG. 2A) is that the light spatial distribution unit 21a and the chromatic-dispersion light-splitting unit 12a of the detecting system S8 of this embodiment are integrated together into a single piece. The relative positions and operational principle of the elements are about the same as the foregoing embodiment (detecting system S2 in FIG. 2A) and therefore are not described here for conciseness.

Figure 9A:
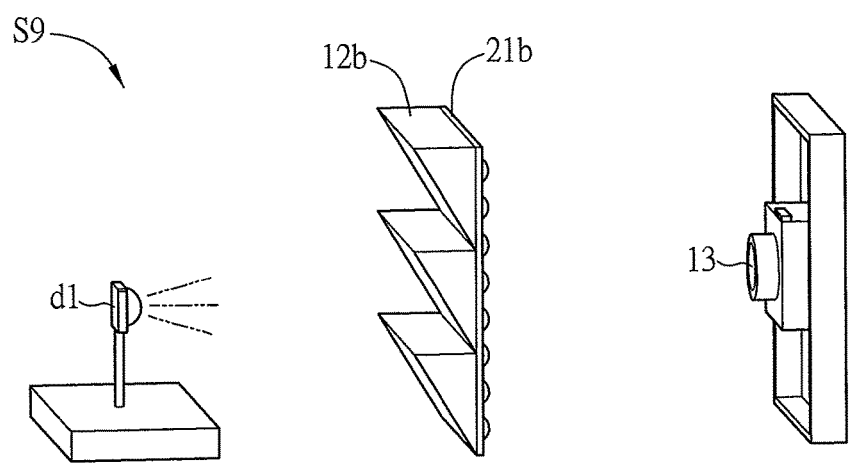
FIG. 9A is a schematic diagram of a detecting system of the ninth embodiment of the invention.
Figure 9B:
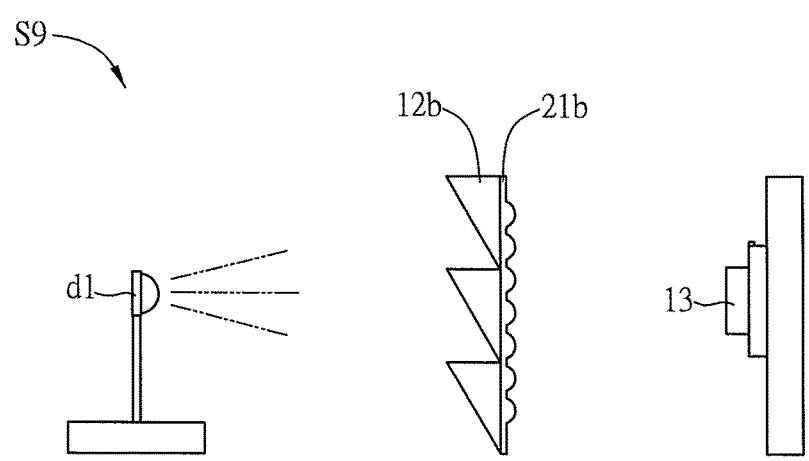
FIG. 9B is a schematic side view of the detecting system in FIG. 9A.

FIG. 9A is a schematic diagram of a detecting system of the ninth embodiment of the invention, and FIG. 9B is a schematic side view of the detecting system in FIG. 9A. As shown in FIGS. 9A and 9B, the main difference from the previous embodiment (detecting system S8 in FIG. 8A) is that the chromatic-dispersion light-splitting unit 12b is disposed on the side adjacent to the LED d1 while the light spatial distribution unit 21b is disposed on the side of the chromatic-dispersion light-splitting unit 12b away from the LED d1, and the chromatic-dispersion light-splitting unit 12b and the light spatial distribution unit 21b are integrated into a single piece. The light emitted by the LED d1 will first pass through the chromatic-dispersion light-splitting unit 12b so that the light splitting signal can be generated. Then, the light splitting signal will pass through the light spatial distribution unit 21b and forms a plurality of point light sources. After receiving the point light sources, the detecting unit 13 can generate the optical field distribution of the light emitted by the LED d1. The rest illustration is about the same as the foregoing embodiment (detecting system S2 in FIG. 2A) and therefore is omitted here for conciseness.

Figure 10A:
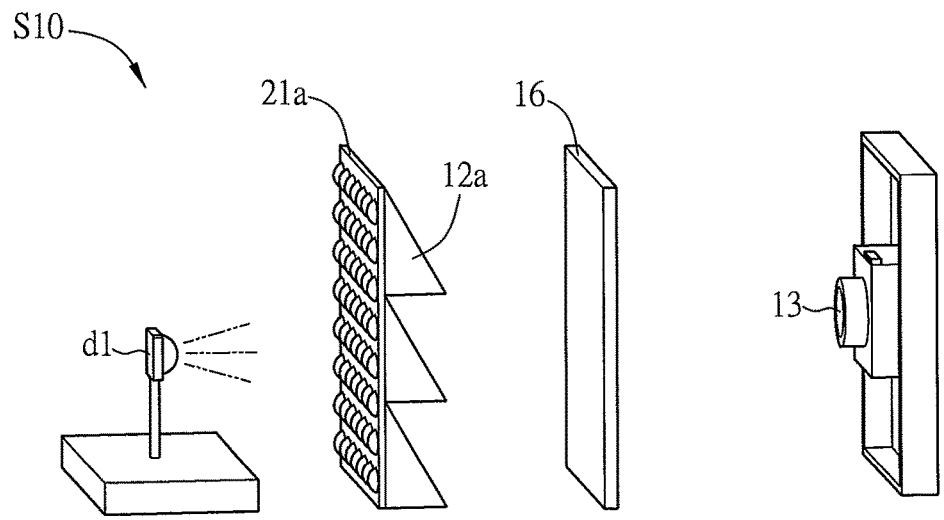
FIG. 10A is a schematic diagram of a detecting system of the tenth embodiment of the invention.
Figure 10B:
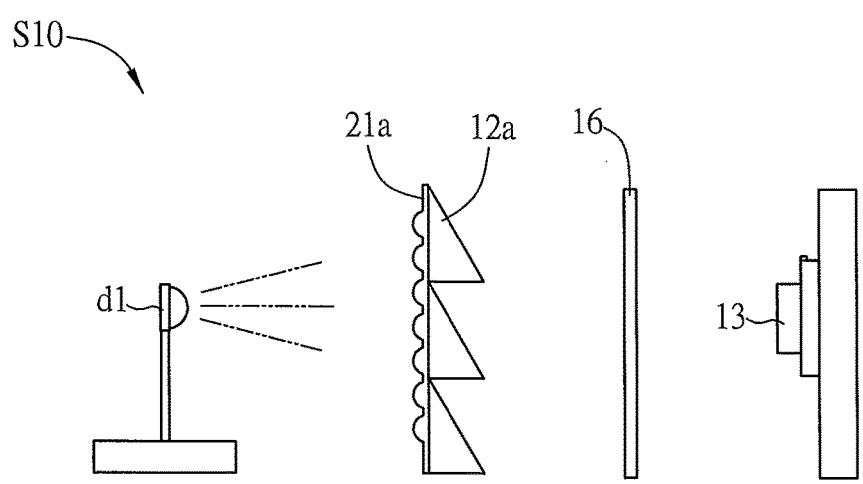
FIG. 10B is a schematic side view of the detecting system in FIG. 10A.

FIG. 10A is a schematic diagram of a detecting system of the tenth embodiment of the invention, and FIG. 10B is a schematic side view of the detecting system in FIG. 10A. As shown in FIGS. 10A and 10B, the main difference from the foregoing embodiment (detecting system S8 in FIG. 8A) is that the detecting system S10 of this embodiment further includes a light receiving unit 16, which is disposed between the light spatial distribution unit 21a and the detecting unit 13. The light receiving unit 16 can be a white screen for example, and receives the plural point light sources emitted from the light spatial distribution unit 21a and generates a plurality of light-receiving signals. The detecting unit 13 receives the light-receiving signals to generate the optical field distribution of the light emitted by the LED d1.

Figure 11:
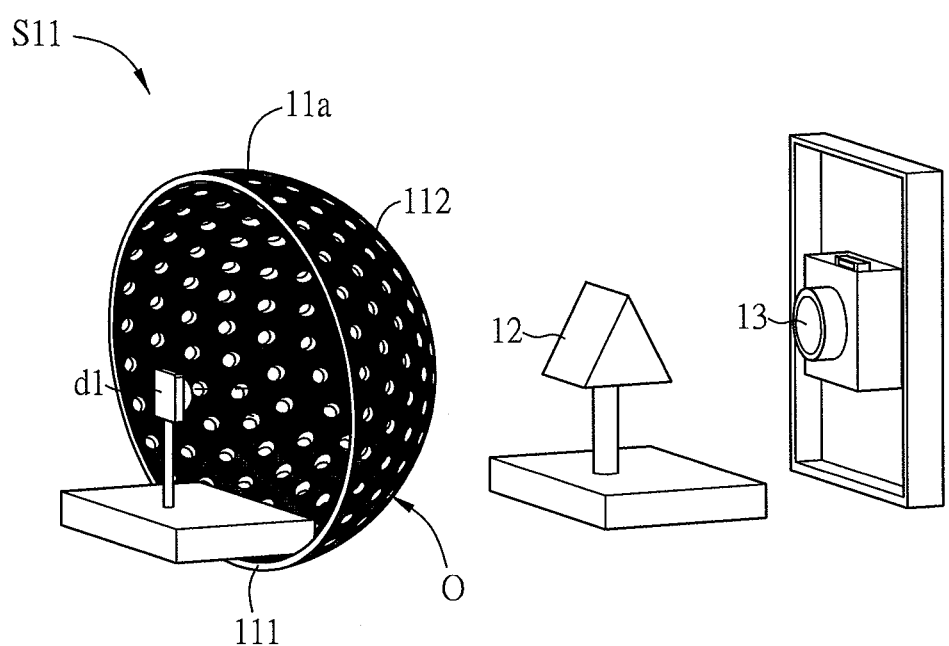
FIG. 11 is a schematic diagram of a detecting system of the eleventh embodiment of the invention.

FIG. 11 is a schematic diagram of a detecting system of the eleventh embodiment of the invention. The main difference from the foregoing embodiment (detecting system S1 in FIG. 1) is that the light spatial distribution unit 11a of the detecting system S11 of this embodiment is a curved structure. The rest illustration is about the same as the foregoing embodiment and therefore is not described here for conciseness.

Figure 12:
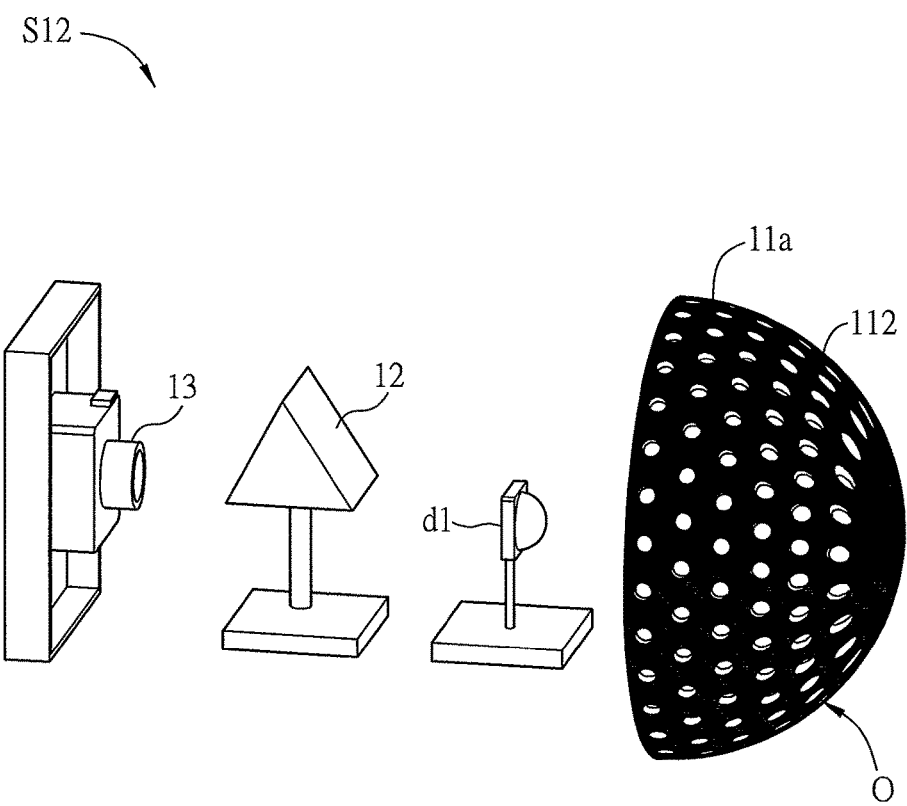
FIG. 12 is a schematic diagram of a detecting system of the twelfth embodiment of the invention.

FIG. 12 is a schematic diagram of a detecting system of the twelfth embodiment of the invention. The main difference from the previous embodiment (detecting system S11 in FIG. 11) is that the detecting system S12 of this embodiment is a reflective detection structure. The chromatic-dispersion light-splitting unit 12 is disposed on the side of the light spatial distribution unit 11a away from the LED d1, and the detecting unit 13 is disposed on the side of the chromatic-dispersion light-splitting unit 12 away from the LED d1. The rest illustration is about the same as the foregoing embodiment and therefore is not described here for conciseness.

Summarily, the detecting system of the invention can detect the under-test light of an under-test object. The light spatial distribution unit receives the under-test light and forms a plurality of point light sources of different positions, the chromatic-dispersion light-splitting unit receives the point light sources and generates a light-splitting signal, and the detecting unit receives the light-splitting signal to generate the spectrum and optical field distribution of the under-test light. By the detecting system of the invention, the spectrum and optical field distribution of the under-test object can be detected just by one-time detection step, unlike the multi-time single-point detection executed by the conventional goniophotometer. Therefore, the detecting system of the invention has advantages such as low cost and rapid detection and can detect the spatial spectrum distribution.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A detecting system for detecting an under-test light of an under-test object, comprising:
   a light spatial distribution unit disposed on a side of the under-test object to receive the under-test light and form a plurality of point light sources;
   a chromatic-dispersion light-splitting unit disposed on a side of the light spatial distribution unit to receive the point light sources and generate a light-splitting signal; and
   a detecting unit disposed on a side of the chromatic-dispersion light-splitting unit to receive the light-splitting signal and generate an optical field distribution of the under-test light.

2. The detecting system as recited in claim 1, wherein the light spatial distribution unit is a screen which has a plurality of holes.

3. The detecting system as recited in claim 2, wherein the screen is flat structure or a curved structure.

4. The detecting system as recited in claim 2, wherein the screen includes a screen body and a carbon powder layer or a print layer, and the carbon powder layer or the print layer is disposed on the surface of the screen body adjacent to the under-test object.

5. The detecting system as recited in claim 1, wherein the material of the light spatial distribution unit is cloth, black flannelette, paper, black flannelette paper, glass, fiber or plastic.

6. The detecting system as recited in claim 1, wherein the light spatial distribution unit is a lens array, mirror array or their combination.

7. The detecting system as recited in claim 6, wherein the lens array is a convex lens array, concave lens array, Fresnel lens array or grin lens array.

8. The detecting system as recited in claim 6, wherein the mirror array is a concave mirror array, a convex mirror array or a plane mirror array.

9. The detecting system as recited in claim 1, wherein the under-test object is a light emitting element or an optical element.

10. The detecting system as recited in claim 1, wherein the chromatic-dispersion light-splitting unit is a triangular prism, an optical grating, a holographic optical element, a Blazed grating or a light splitter composed of a plurality optical elements.

11. The detecting system as recited in claim 1, wherein the detecting unit is a brightness photometer, illuminometer, power meter, camera or spectrometer.

12. The detecting system as recited in claim 1, wherein the optical field distribution is a light intensity distribution or light spectrum distribution in space.

13. The detecting system as recited in claim 1, wherein the detecting unit and the under-test object are disposed on the same side of the light spatial distribution unit.

14. The detecting system as recited in claim 1, wherein the detecting unit and the under-test object are disposed on different sides of the light spatial distribution unit.

15. The detecting system as recited in claim 1, further comprising:
a holding unit keeping the relative distances between the under-test object, the light spatial distribution unit, the chromatic-dispersion light-splitting unit and the detecting unit.

16. The detecting system as recited in claim 1, further comprising:
a cover having an accommodating space for accommodating the under-test object, the light spatial distribution unit, the chromatic-dispersion light-splitting unit and the detecting unit.

17. The detecting system as recited in claim 1, further comprising:
a light receiving unit disposed between the light spatial distribution unit and the chromatic-dispersion light-splitting unit, so that the point light sources form an optical field pattern on the light receiving unit.

18. The detecting system as recited in claim 1, wherein the light spatial distribution unit and the chromatic-dispersion light-splitting unit are integrated into a single piece.

19. A detecting system for detecting an under-test light of an under-test object, comprising:
a chromatic-dispersion light-splitting unit disposed on a side of the under-test object to receive the under-test light and form a light-splitting signal;
a light spatial distribution unit disposed on a side of the chromatic-dispersion light-splitting unit to receive the light-splitting signal and generate a plurality of point light sources; and
a detecting unit disposed on a side of the light spatial distribution unit to receive the point light sources and generate an optical field distribution of the under-test light.

20. The detecting system as recited in claim 19, wherein the light spatial distribution unit is a lens array.

21. The detecting system as recited in claim 19, further comprising:
a light receiving unit disposed between the light spatial distribution unit and the detecting unit, and receiving the point light sources and generating a plurality of light-receiving signals, wherein the detecting unit receives the light-receiving signals and generate the optical field distribution of the under-test light.

22. The detecting system as recited in claim 19, wherein the light spatial distribution unit and the chromatic-dispersion light-splitting unit are integrated into a single piece.

* * * * *